(12) United States Patent  (10) Patent No.: US 7,817,356 B2
Nio  (45) Date of Patent: Oct. 19, 2010

(54) IMAGING LENS, AND IMAGING APPARATUS AND MOBILE TERMINAL APPARATUS USING THE SAME

(75) Inventor: Junichi Nio, Chiba (JP)

(73) Assignee: SEIKO Precision Inc. (JP)

( * ) Notice: Subject to any disclaimer, the term of this patent is extended or adjusted under 35 U.S.C. 154(b) by 0 days.

(21) Appl. No.: 12/520,835

(22) PCT Filed: Dec. 21, 2007

(86) PCT No.: PCT/JP2007/074734

§ 371 (c)(1),
(2), (4) Date: Jun. 22, 2009

(87) PCT Pub. No.: WO2008/078709

PCT Pub. Date: Jul. 3, 2008

(65) Prior Publication Data

US 2010/0053775 A1   Mar. 4, 2010

(30) Foreign Application Priority Data

Dec. 22, 2006  (JP)  ............................. 2006-346287

(51) Int. Cl.
*G02B 9/34* (2006.01)
(52) U.S. Cl. ...................................... 359/772; 359/773
(58) Field of Classification Search .................. 359/772, 359/773, 774, 686, 687
See application file for complete search history.

(56) References Cited

FOREIGN PATENT DOCUMENTS

| JP | 2002-365529 | 12/2002 |
|---|---|---|
| JP | 2002-365530 | 12/2002 |
| JP | 2005-292559 | 10/2005 |
| JP | 2007-017984 | 1/2007 |
| JP | 2007-219520 | 8/2007 |

*Primary Examiner*—Alicia M Harrington
(74) *Attorney, Agent, or Firm*—Townsend and Townsend and Crew LLP

(57) ABSTRACT

An imaging lens comprises a first lens (L1), a second lens (L2), a third lens (L3), and a fourth lens (L4), which are arranged in ascending sequence, starting from the lens nearest to the object. The first lens (L1) has a double-convex shape and positive refractive power. The second lens (L2) has a double-concave shape and negative refractive power. The third lens (L3) has a meniscus shape with its convex surface facing an image plane, and has positive refractive power. The fourth lens (L4) has a meniscus shape with its convex surface facing the object. A chromatic aberration occurred in the first lens (L1) is corrected by the second lens (L2). A chromatic aberration occurred in the third lens (L3) is corrected by the fourth lens (L4).

8 Claims, 11 Drawing Sheets

IMAGING LENS ACCORDING TO EMBODIMENT 3

IMAGING LENS ACCORDING TO EMBODIMENT 1

IMAGING LENS ACCORDING TO EMBODIMENT 2

IMAGING LENS ACCORDING TO EMBODIMENT 3

IMAGING LENS ACCORDING TO EMBODIMENT 4

IMAGING LENS ACCORDING TO EMBODIMENT 5

ABERRATION GRAPHS OF EMBODIMENT 1

ABERRATION GRAPHS OF EMBODIMENT 2

ABERRATION GRAPHS OF EMBODIMENT 3

ABERRATION GRAPHS OF EMBODIMENT 4

ABERRATION GRAPHS OF EMBODIMENT 5

IMAGING LENS, AND IMAGING APPARATUS AND MOBILE TERMINAL APPARATUS USING THE SAME

TECHNICAL FIELD

The present invention relates to an imaging lens using four lenses.

BACKGROUND ART

In recent years, the size of solid state imaging devices for mobile cameras to be installed in, for example, cellular phones have been reduced, and solid state imaging devices whose pixel size is equal to or less than 2 μm are in use.

In order to achieve practical use of an imaging lens whose performance is sufficient for solid state imaging devices with such a small pixel size, four lenses need to be provided, and aberrations to be sufficiently corrected.

An imaging lens using four lenses is disclosed in the following patent literature:

Patent Literature 1: Unexamined Japanese Patent Application KOKAI Publication No. 2002-365529

DISCLOSURE OF INVENTION

Problems to Be Solved by the Invention

An imaging lens disclosed in the above patent literature 1 has a large numerical aperture, whereby astigmatism and distortions are satisfactorily corrected. However, as spherical aberrations and coma aberrations are not sufficiently corrected, the image forming performance is poor and the overall length of the imaging lens has not been reduced.

The present invention has been made in view of the above-mentioned problems and, therefore, an object of the present invention is to provide an imaging lens that is small in size and in which various aberrations are satisfactorily corrected.

Means for Solving the Problem

In order to achieve the above-mentioned object, an imaging lens according to an aspect of the present invention comprises:

a first lens, a second lens, a third lens, and a fourth lens, which are arranged in ascending sequence, starting from a lens nearest to an object, wherein:

the first lens has a double-convex shape and positive refractive power;

the second lens has a double-concave shape and negative refractive power;

the third lens has a meniscus shape with its convex surface facing an image, and has positive refractive power; and the fourth lens has a meniscus shape with its convex surface facing the object, and has negative refractive power.

Further, the imaging lens fulfills following equations (1) to (5):

$$1.55 < f/f1 < 1.7 \quad (1),$$

$$0.9 < f/f3 < 1.65 \quad (2),$$

$$-0.004 < 1/f1 \cdot v1 + 1/f2 \cdot v2 < 0 \quad (3),$$

$$|1/f3 \cdot v3 + 1/f4 \cdot v4| < 0.015 \quad (4), \text{ and}$$

$$0.12 < T23/TTL < 0.16 \quad (5),$$

where f: combined focal length of the entire lens,
f1: focal length of the first lens,
f2: focal length of the second lens,
f3: focal length of the third lens,
f4: focal length of the fourth lens,
v1: Abbe number of line d of the first lens,
v2: Abbe number of line d of the second lens,
v3: Abbe number of line d of the third lens,
v4: Abbe number of line d of the fourth lens,
T23: spacing between the second lens and the third lens, and
TTL: distance from the apex of the first lens to an image plane.

An aperture may, for example, be disposed between the first lens and the object.

It is desirable for the combined focal length f from the first lens to the fourth lens to fulfill the following condition:

$$4.445 \text{ mm} \leq f \leq 4.655 \text{ mm}.$$

It is desirable for the combined F value of the first lens to the fourth lens to fulfill the following condition:

$$2.8 \leq F \leq 3.5.$$

It is desirable for the combined angle of view 2ω of the first lens to the fourth lens to fulfill the following condition:

$$62.5° \leq 2\omega \leq 67.3°.$$

A parallel plane glass plate may be disposed so that it is between the fourth lens and an image forming plane.

An imaging apparatus may comprise the above-mentioned imaging lens and an imaging device that converts an image of the object, formed by the imaging lens, into electric signals.

A mobile terminal apparatus which comprises the above-mentioned imaging apparatus may be provided.

Effects of the Invention

According to the present invention, an imaging lens that is small in size and in which various aberrations are satisfactorily corrected can be realized.

EXPLANATION OF REFERENCE NUMERALS

Figure 1:
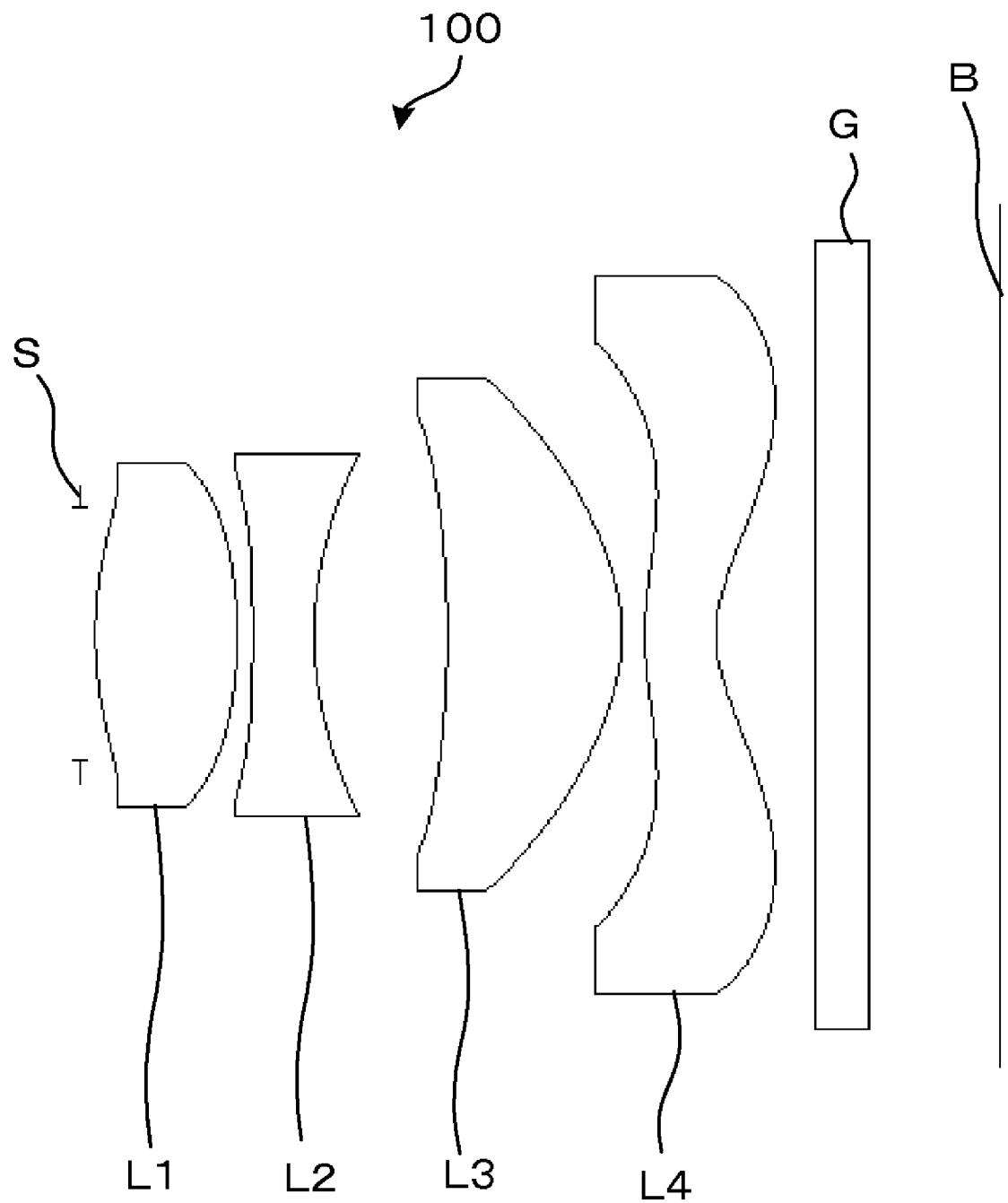
FIG. 1 is a schematic view of an imaging lens according to an embodiment 1.

L1-L4 first to fourth lenses
S aperture
B image plane

BEST MODE FOR CARRYING OUT THE INVENTION

As in the case of the embodiments 1 to 5, which are described below, an imaging lens of the present invention comprises a first lens L1, a second lens L2, a third lens L3, and a fourth lens L4. These lenses are arranged in ascending sequence, starting from the lens nearest to an object.

The first lens L1 has a double-convex shape and positive refractive power. The second lens L2 has a double-concave shape and negative refractive power. The third lens L3 has a meniscus shape with its convex surface facing an image, and has positive refractive power. The fourth lens L4 has a meniscus shape with its convex surface facing the object, and has negative refractive power.

An aperture S is disposed between the lens L1 and the object, and a parallel plane glass plate G serving as a filter or a covering glass plate is disposed between the lens L4 and an image plane B.

The imaging lens according to each of the embodiments 1-5 fulfills following equations (1) to (5):

$$1.55 < f/f1 < 1.7 \quad (1),$$

$$0.9 < f/f3 < 1.65 \quad (2),$$

$$-0.004 < 1/f1v1 + 1/f2v2 < 0 \quad (3),$$

$$|1/f3v3 + 1/f4v4| < 0.015 \quad (4), \text{ and}$$

$$0.12 < T23/TTL < 0.16 \quad (5),$$

where
f: combined focal length of the entire lens,
f1: focal length of the first lens L1,
f2: focal length of the second lens L2,
f3: focal length of the third lens L3,
f4: focal length of the fourth lens L4,
v1: Abbe number of line d of the first lens L1,
v2: Abbe number of line d of the second lens L2,
v3: Abbe number of line d of the third lens L3,
v4: Abbe number of line d of the fourth lens L4,
T23: spacing between the second lens L2 and the third lens L3, and
TTL: distance from the apex of the first lens L1 to the image plane B.

The embodiments 1 to 5 of the present invention will be explained in detail below with reference to the attached drawings and tables.

Embodiment 1

As illustrated in FIG. 1, an imaging lens according to the embodiment 1 of the present invention has the following lens configuration:

Table 1(a) is a table showing data on the configuration of the imaging lens according to the embodiment 1.

Table 1(b) is a table showing the aspherical coefficient of the imaging lens according to the embodiment 1.

TABLE 1(a)

Data on configuration of the imaging lens

| No. | r | d | nd | vd | |
|---|---|---|---|---|---|
| s1 | 0.0000 | 0.100 | | | Aperture |
| 2 | 2.488 | 0.925 | 1.53116 | 56 | First lens |
| 3 | −3.037 | 0.100 | | | |
| 4 | −28.484 | 0.400 | 1.58547 | 30 | Second lens |
| 5 | 2.099 | 0.868 | | | |
| 6 | −6.334 | 1.137 | 1.53116 | 56 | Third lens |
| 7 | −1.310 | 0.150 | | | |
| 8 | 2.066 | 0.464 | 1.53116 | 30 | Fourth lens |
| 9 | 0.872 | 0.650 | | | |
| 10 | 0.000 | 0.350 | 1.5168 | 64 | Parallel plane glass plate |
| 11 | 0.000 | 0.855 | | | |
| 12 | 0.000 | 0.000 | | | |

TABLE 1(b)

Conical coefficient and aspherical coefficient

| | k | α4 | α6 | α8 | α10 | α12 |
|---|---|---|---|---|---|---|
| 2 | −1.769373396 | −0.002536898 | −0.012261241 | −0.026981607 | 0.024703563 | −0.024502512 |
| 3 | 3.178393447 | −0.021123253 | −0.030578332 | 0.011072979 | −0.001709723 | −0.00390471 |
| 4 | 0 | −0.098939915 | 0.008910474 | 0.016588865 | −0.004314961 | 0.003368669 |
| 5 | −3.875315916 | −0.021697245 | 0.024025657 | −0.000759005 | 0.001669814 | 0.000960425 |
| 6 | 0 | 0.023235673 | −0.02456513 | 0.004566098 | 0.002261709 | −0.001086173 |
| 7 | −0.544180791 | 0.121669299 | −0.054622542 | 0.016503186 | −0.001067954 | −0.000117652 |
| 8 | −18.15615641 | −0.070711947 | −0.001487229 | 0.00367362 | −0.000154773 | −9.29292E−05 |
| 9 | −3.935881495 | −0.076327375 | 0.020484091 | −0.004670838 | 0.000627873 | −3.94422E−05 |

The focal length f of the entire imaging lens according to this embodiment is 4.610 mm, the F value is F2.8, and the angle of view 2ω is 62.5°.

Each of the lenses L1, L2, L3, and L4 comprises two lens surfaces, the aperture S comprises one surface, and the parallel plane glass plate G comprises two surfaces.

Table 1(a) presents the curvature radius of each lens surface "r", the distance "d", the refraction index with respect to line d "nd", and the Abbe number "vd". The "No." column in Table 1(a) lists lens surface numbers, which are assigned in ascending sequence, starting from the lens surface nearest to the object. The lens surface number "s1" denotes the aperture S. The distance "d" denotes the distance from one lens surface to the next one.

The aspherical shape of each lens surface is given by equation (6), where the z axis represents the light axis direction; the y axis represents the direction orthogonal to the light axis; "c" denotes the inverse number of the curvature radius; "k" denotes the conical coefficient; and "$\alpha_4$", "$\alpha_6$", "$\alpha_8$", "$\alpha_{10}$", and "$\alpha_{12}$" denote aspherical coefficients.

[Equation 1]

$$z = \frac{cy^2}{1 + \sqrt{1 - (1+k)c^2 y^2}} + a_4 y^4 + a_6 y^6 + a_8 y^8 + a_{10} y^{10} + a_{12} y^{12} \qquad (6)$$

Table 1(b) presents the conical coefficient "k" and the aspherical coefficients "$\alpha_4$", "$\alpha_6$", "$\alpha_8$", "$\alpha_{10}$", and "$\alpha_{12}$" of the lens surfaces of the embodiment 1. The "No." column in Table 1(b) lists lens surface numbers corresponding to those in the "No." column of Table 1(a).

Embodiment 2

Figure 2:
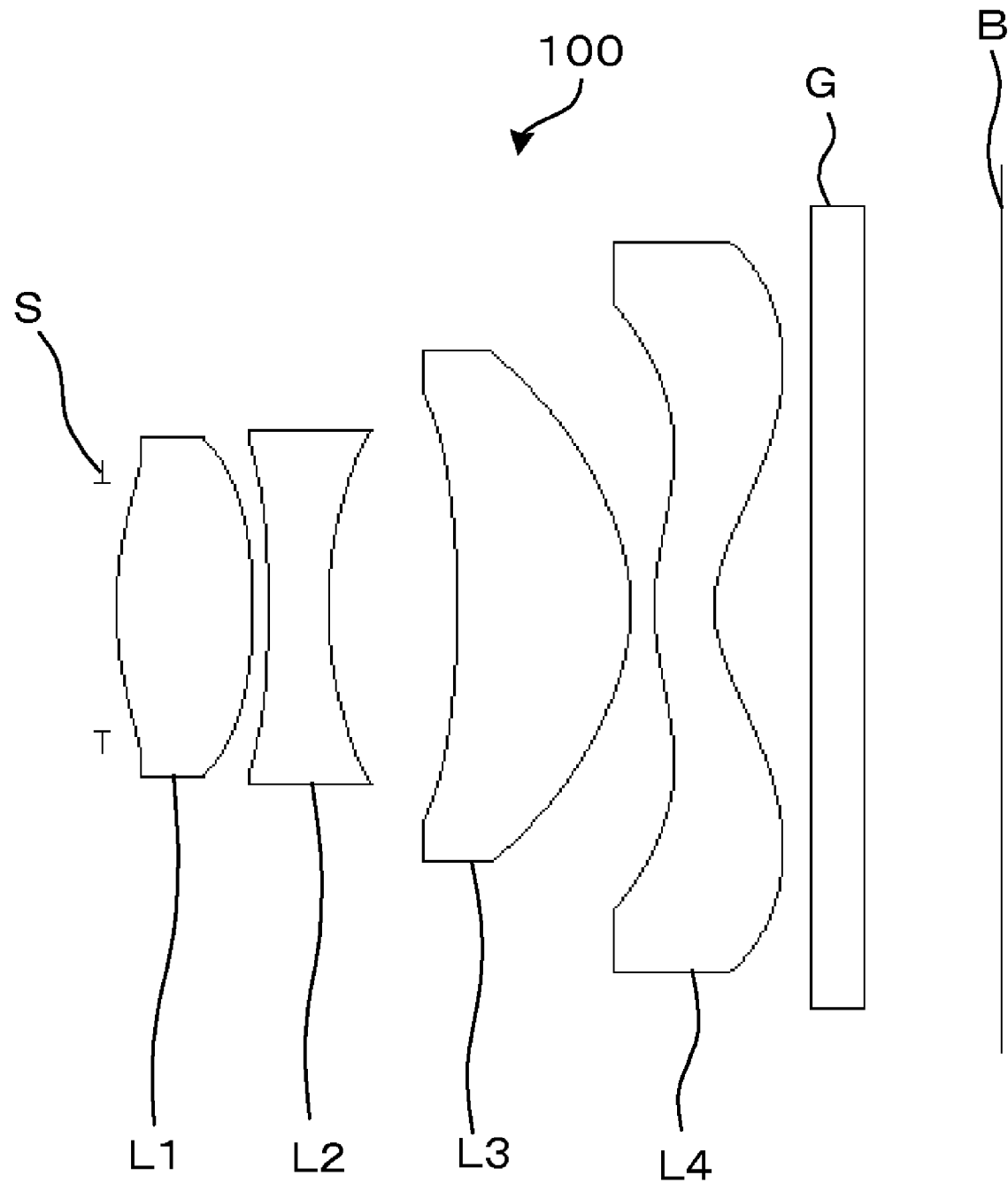
FIG. 2 is a schematic view of an imaging lens according to an embodiment 2.

As illustrated in FIG. 2, an imaging lens according to the embodiment 2 of the present invention has the following lens configuration:

Table 2(a) is a table showing data on the configuration of the imaging lens according to the embodiment 2.

Table 2(b) is a table showing the aspherical coefficient of the imaging lens according to the embodiment 2.

The focal length f of the entire imaging lens according to this embodiment is 4.608 mm, the F value is F2.8, and the angle of view 2ω is 64.5°.

Assuming that each of the lenses L1, L2, L3, and L4 comprises two lens surfaces, that the aperture S comprises one surface, and that the parallel plane glass plate G comprises two surfaces, Table 2(a) presents the curvature radius of each lens surface "r", the distance "d", the refraction index with respect to line d "nd", and the Abbe number "vd". The "No." column in Table 2(a) lists lens surface numbers, which are assigned in ascending sequence, starting from the lens surface nearest to the object. The lens surface number "s1" denotes the aperture S. The distance "d" denotes the distance from one lens surface to another.

Table 2(b) presents the conical coefficient "k" and the aspherical coefficients "$\alpha_4$", "$\alpha_6$", "$\alpha_8$", "$\alpha_{10}$", and "$\alpha_{12}$" of the lens surface of the embodiment 2. The "No." column in Table 2(b) lists lens surface numbers corresponding to those in the "No." column of Table 2(a).

Embodiment 3

Figure 3:
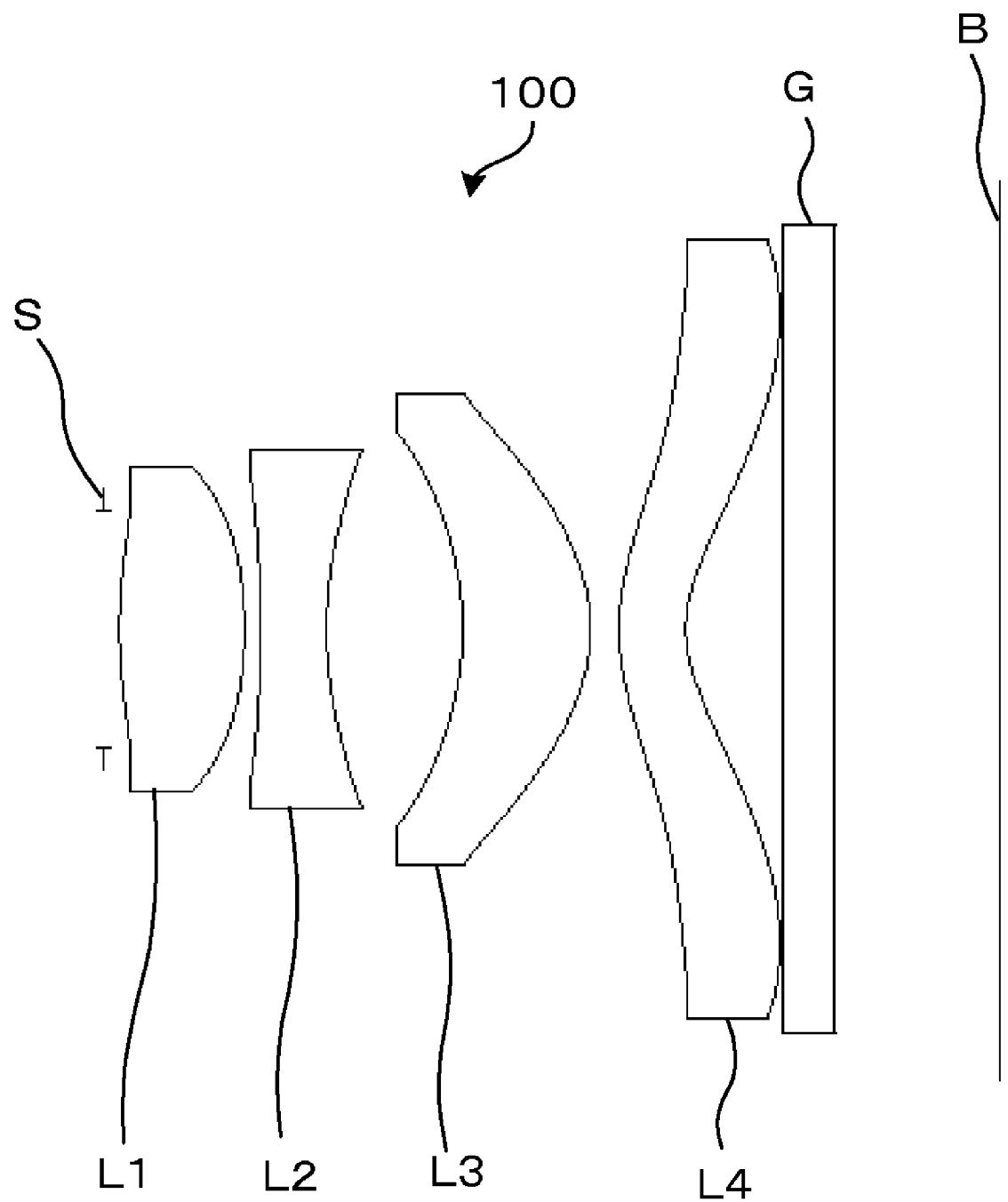
FIG. 3 is a schematic view of an imaging lens according to an embodiment 3.

As illustrated in FIG. 3, an imaging lens according to the embodiment 3 of the present invention has the following lens configuration:

Table 3(a) is a table showing data on the configuration of the imaging lens according to the embodiment 3.

Table 3(b) is a table showing the aspherical coefficient of the imaging lens according to the embodiment 3.

TABLE 2(a)

Data on configuration of the imaging lens

| No. | r | d | nd | vd | |
|---|---|---|---|---|---|
| s1 | 0.000 | 0.100 | | | Aperture |
| 2 | 2.416 | 0.908 | 1.53116 | 56 | First lens |
| 3 | −3.359 | 0.100 | | | |
| 4 | −14.406 | 0.400 | 1.58547 | 30 | Second lens |
| 5 | 2.444 | 0.862 | | | |
| 6 | −5.781 | 1.155 | 1.53116 | 56 | Third lens |
| 7 | −1.357 | 0.154 | | | |
| 8 | 1.556 | 0.400 | 1.53116 | 30 | Fourth lens |
| 9 | 0.781 | 0.650 | | | |
| 10 | 0.000 | 0.350 | 1.5168 | 64 | Parallel plane glass plate |
| 11 | 0.000 | 0.920 | | | |
| 12 | 0.000 | 0.000 | | | |

TABLE 3(a)

Data on configuration of the imaging lens

| No. | r | d | nd | vd | |
|---|---|---|---|---|---|
| s1 | 0.000 | 0.100 | | | Aperture |
| 2 | 3.248 | 0.840 | 1.53116 | 56 | First lens |
| 3 | −2.610 | 0.100 | | | |
| 4 | −44.493 | 0.450 | 1.607 | 27 | Second lens |
| 5 | 2.591 | 0.914 | | | |
| 6 | −2.053 | 0.857 | 1.53116 | 56 | Third lens |
| 7 | −1.159 | 0.190 | | | |
| 8 | 1.450 | 0.450 | 1.53116 | 56 | Fourth lens |
| 9 | 0.854 | 0.650 | | | |
| 10 | 0.000 | 0.350 | 1.5168 | 64 | Parallel plane glass plate |
| 11 | 0.000 | 1.100 | | | |
| 12 | 0.000 | 0.000 | | | |

TABLE 2(b)

Conical coefficient and aspherical coefficient

| | k | α4 | α6 | α8 | α10 | α12 |
|---|---|---|---|---|---|---|
| 2 | −1.682206496 | −0.001627847 | −0.009741218 | −0.032307182 | 0.032152198 | −0.0289326 |
| 3 | 4.757370151 | −0.033646083 | −0.019618745 | 0.004921846 | 0.000526094 | −0.004463948 |
| 4 | 0 | −0.086578993 | 0.006468577 | 0.021496861 | −0.011107713 | 0.005771619 |
| 5 | −2.569976541 | −0.020735684 | 0.023323707 | 0.000750926 | −0.001260885 | 0.000512636 |
| 6 | 0 | 0.01980879 | −0.025761187 | 0.003654112 | 0.002072957 | −0.000706273 |
| 7 | −0.488011208 | 0.117400853 | −0.055833701 | 0.018857554 | −0.002975043 | 0.000332599 |
| 8 | −9.602261993 | −0.070776493 | −0.003651571 | 0.004563243 | −0.000519578 | −1.17693E−05 |
| 9 | −3.325766149 | −0.078686195 | 0.020520578 | −0.004194509 | 0.00049494 | −2.6369E−05 |

TABLE 3(b)

| | Conical coefficient and aspherical coefficient | | | | |
|---|---|---|---|---|---|
| K | $\alpha 4$ | $\alpha 6$ | $\alpha 8$ | $\alpha 10$ | $\alpha 12$ |
| 2 | −5.445410471 | −0.016494144 | −0.027048838 | −0.034254466 | 0.026224681 | −0.028966687 |
| 3 | 3.093624573 | −0.04162285 | −0.00304098 | 0.009755402 | −0.006740254 | −0.001409199 |
| 4 | 0 | −0.079039726 | 0.015924084 | 0.022311377 | −0.001063367 | −0.001786343 |
| 5 | −1.932725541 | −0.027881945 | 0.006789422 | 0.004095546 | −0.001088964 | 0.000139855 |
| 6 | 0 | 0.043524701 | −0.027042594 | 0.006040632 | 0.000453537 | −0.000461125 |
| 7 | −0.607198529 | 0.108561192 | −0.032544575 | 0.009712425 | −0.001234109 | 0.000594101 |
| 8 | −6.994204432 | −0.006514481 | −0.006298051 | 0.001846379 | −0.000161209 | 2.74617E−06 |
| 9 | −3.7117847 | −0.03077069 | 0.006035502 | −0.001473449 | 0.000214239 | −1.20806E−05 |

The focal length f of the entire lens of the imaging lens according to this embodiment is 4.445 mm, the F value is F2.8, and the angle of view 2ω is 67.3°.

Assuming that each of the lenses L1, L2, L3, and L4 comprises two lens surfaces, that the aperture S comprises one surface, and that the parallel plane glass plate G comprises two surfaces, Table 3(a) presents the curvature radius of each lens surface "r", the distance "d", the refraction index with respect to line d "nd", and the Abbe number "vd". The "No." column in Table 3(a) lists lens surface numbers, which are assigned in ascending sequence, starting from the lens surface nearest to the object. The lens surface number "s1" denotes the aperture S. The distance "d" denotes the distance from one lens surface to the next one.

Table 3(b) presents the conical coefficient "k" and the aspherical coefficients "$\alpha_4$", "$\alpha_6$", "$\alpha_8$", "$\alpha_{10}$", and "$\alpha_{12}$" of the lens surfaces of the embodiment 3. The "No." column in Table 3(b) lists lens surface numbers corresponding to those in the "No." column of Table 3(a).

Embodiment 4

Figure 4:
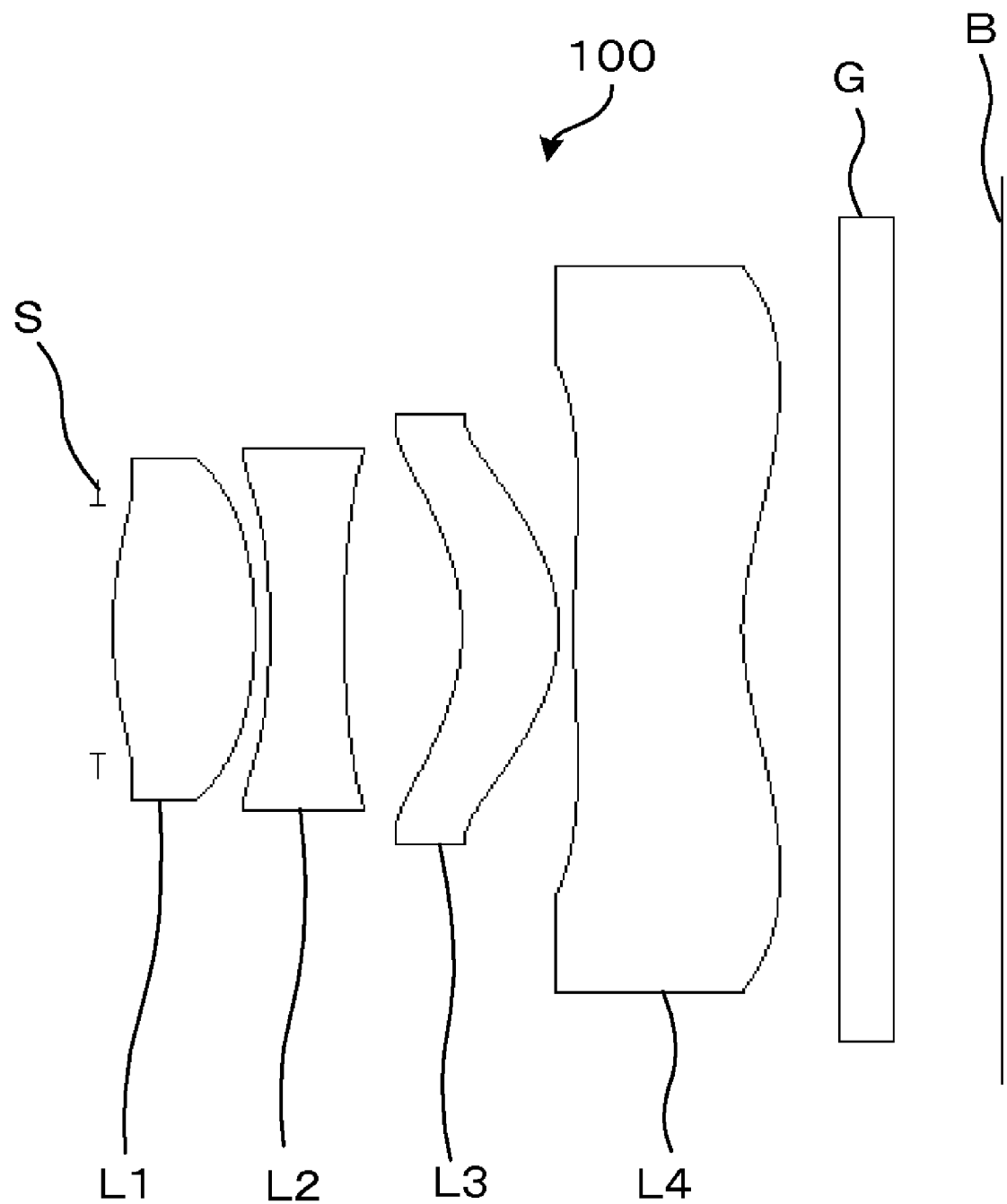
FIG. 4 is a schematic view of an imaging lens according to an embodiment 4.

As illustrated in FIG. 4, an imaging lens according to the embodiment 4 of the present invention has the following lens configuration:

Table 4(a) is a table showing data on the configuration of the imaging lens according to the embodiment 4.

Table 4(b) is a table showing the aspherical coefficient of the imaging lens according to the embodiment 4.

TABLE 4(a)

| | Data on configuration of the imaging lens | | | | |
|---|---|---|---|---|---|
| No. | r | d | nd | vd | |
| s1 | 0.000 | 0.100 | | | Aperture |
| 2 | 2.533 | 0.942 | 1.53116 | 56 | First lens |
| 3 | −3.084 | 0.100 | | | |
| 4 | −5.585 | 0.490 | 1.607 | 27 | Second lens |
| 5 | 6.130 | 0.785 | | | |
| 6 | −1.466 | 0.641 | 1.53116 | 56 | Third lens |
| 7 | −1.079 | 0.100 | | | |
| 8 | 6.400 | 1.116 | 1.53116 | 56 | Fourth lens |
| 9 | 1.655 | 0.650 | | | |
| 10 | 0.000 | 0.350 | 1.5168 | 64 | Parallel plane glass plate |
| 11 | 0.000 | 0.725 | | | |
| 12 | 0.000 | 0.000 | | | |

TABLE 4(b)

| | Conical coefficient and aspherical coefficient | | | | |
|---|---|---|---|---|---|
| k | $\alpha 4$ | $\alpha 6$ | $\alpha 8$ | $\alpha 10$ | $\alpha 12$ |
| 2 | −2.726475731 | −0.003349243 | −0.00665169 | −0.049408627 | 0.043440464 | −0.03699486 |
| 3 | 4.117573695 | −0.065460835 | −0.02162258 | 0.029907053 | −0.012697532 | −0.00204508 |
| 4 | 0 | −0.065199919 | −0.028933083 | 0.045144977 | −0.000209306 | −0.00182799 |
| 5 | 3.513597764 | 0.009316601 | −0.020723048 | 0.015178551 | −0.004300016 | 0.002410221 |
| 6 | 0 | 0.075413187 | −0.011847085 | 0.032458265 | −0.01581561 | 0.006365875 |
| 7 | −0.5838724 | 0.094444192 | −0.00181416 | 0.003914018 | 0.006437728 | −0.000806788 |
| 8 | −139.2542174 | −0.019783073 | −0.008799896 | 0.006925534 | −0.002187875 | 0.00024261 |
| 9 | −8.268858148 | −0.034381048 | 0.00658013 | −0.001130437 | 8.85848E−05 | −3.25194E−06 |

The focal length f of the entire lens of the imaging lens according to this embodiment is 4.655 mm, the F value is F2.8, and the angle of view $2\omega$ is 64.5°.

Assuming that each of the lenses L1, L2, L3, and L4 comprises two lens surfaces, that the aperture S comprises one surface, and that the parallel plane glass plate G comprises two surfaces, Table 4(a) presents the curvature radius of each lens surface "r", the distance "d", the refraction index with respect to line d "nd", and the Abbe number "νd". The "No." column in Table 4(a) lists lens surface numbers, which are assigned in ascending sequence, starting from the lens surface nearest to the object. The lens surface number "s1" denotes the aperture S. The distance "d" denotes the distance from one lens surface to the next one.

Table 4(b) presents the conical coefficient "k" and the aspherical coefficients "$\alpha_4$", "$\alpha_6$", "$\alpha_8$", "$\alpha_{10}$", and "$\alpha_{12}$" of the lens surfaces of the embodiment 4. The "No." column in Table 4(b) lists lens surface numbers corresponding to those in the "No." column in Table 4(a).

Embodiment 5

Figure 5:
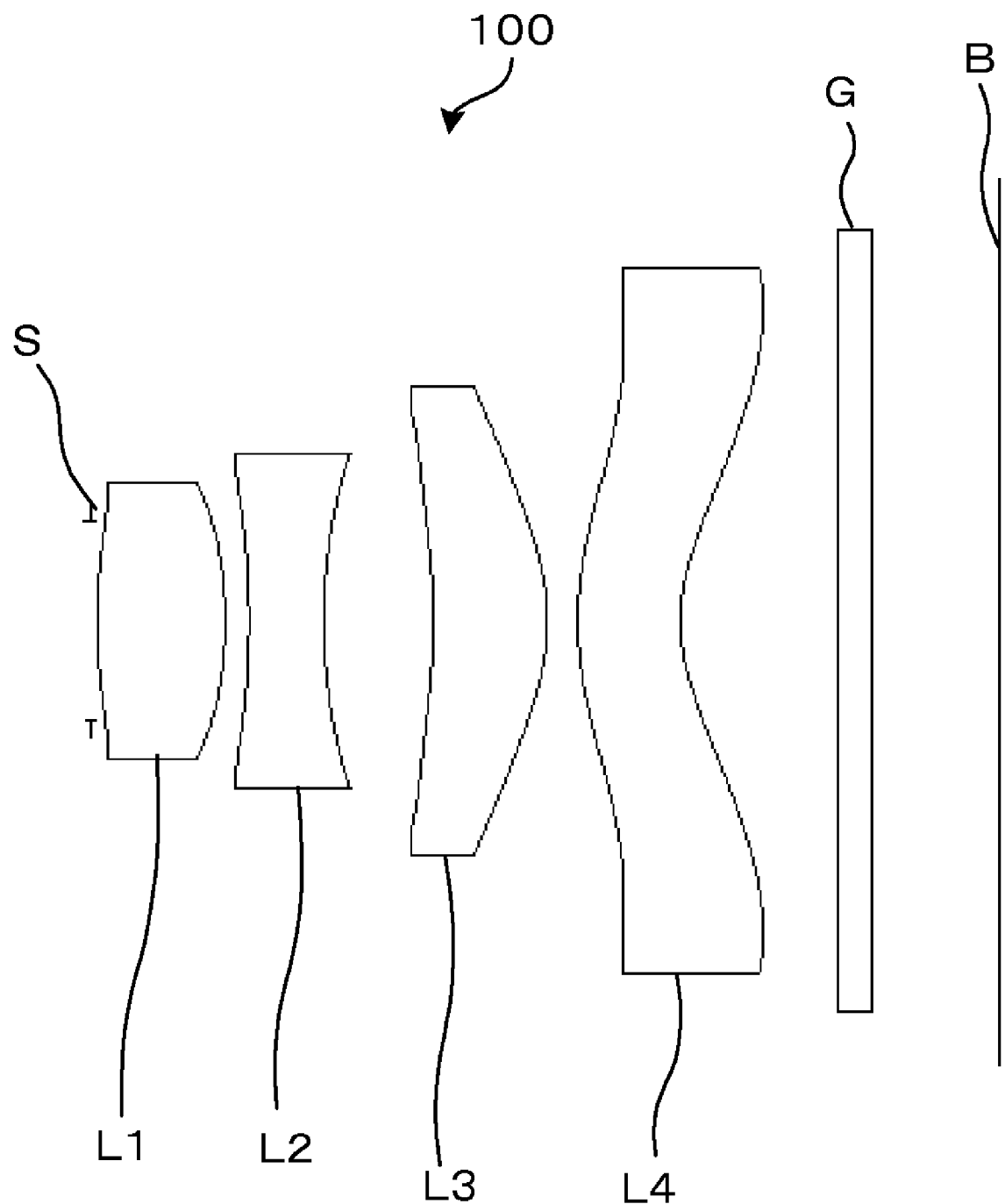
FIG. 5 is a schematic view of an imaging lens according to an embodiment 5.
Figure 6:
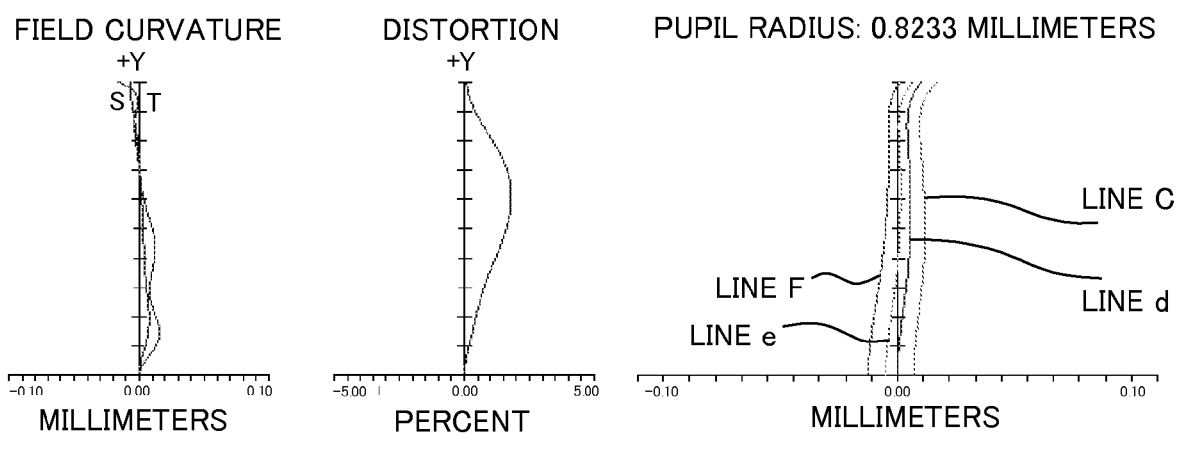
FIG. 6 is aberration graphs illustrating the astigmatism, the image plane distortion, and the spherical aberration of the imaging lens of the embodiment 1.
Figure 7:
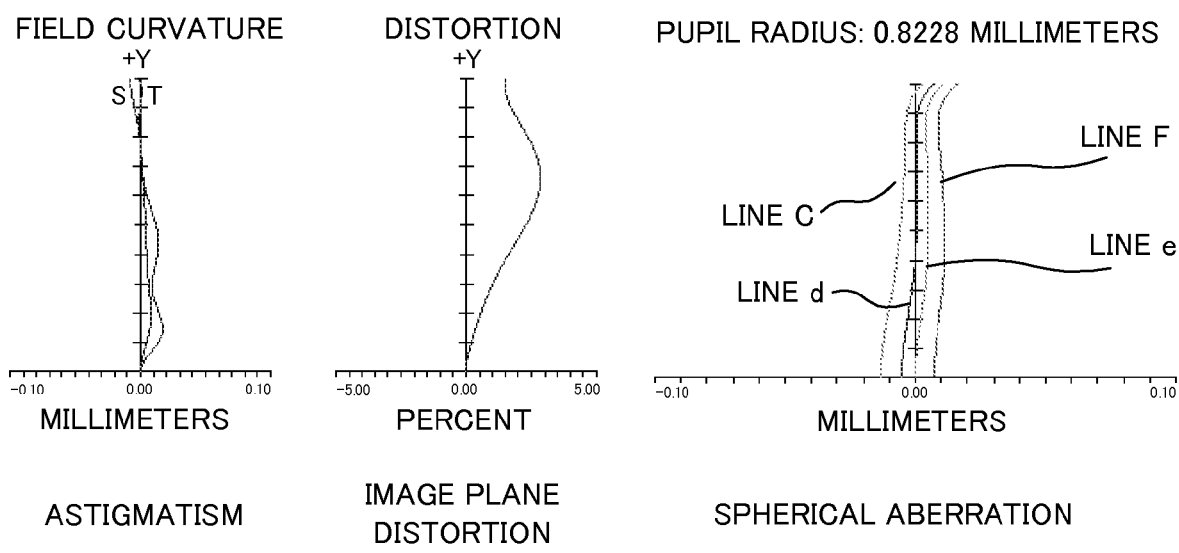
FIG. 7 is aberration graphs illustrating the astigmatism, the image plane distortion, and the spherical aberration of the imaging lens of the embodiment 2.
Figure 8:
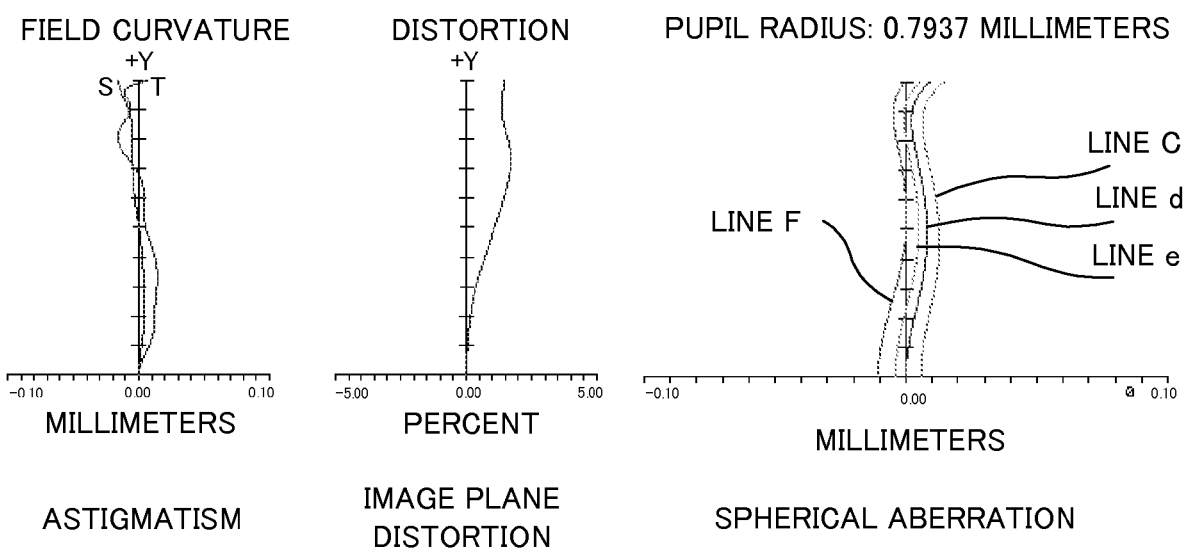
FIG. 8 is aberration graphs illustrating the astigmatism, the image plane distortion, and the spherical aberration of the imaging lens of the embodiment 3.
Figure 9:
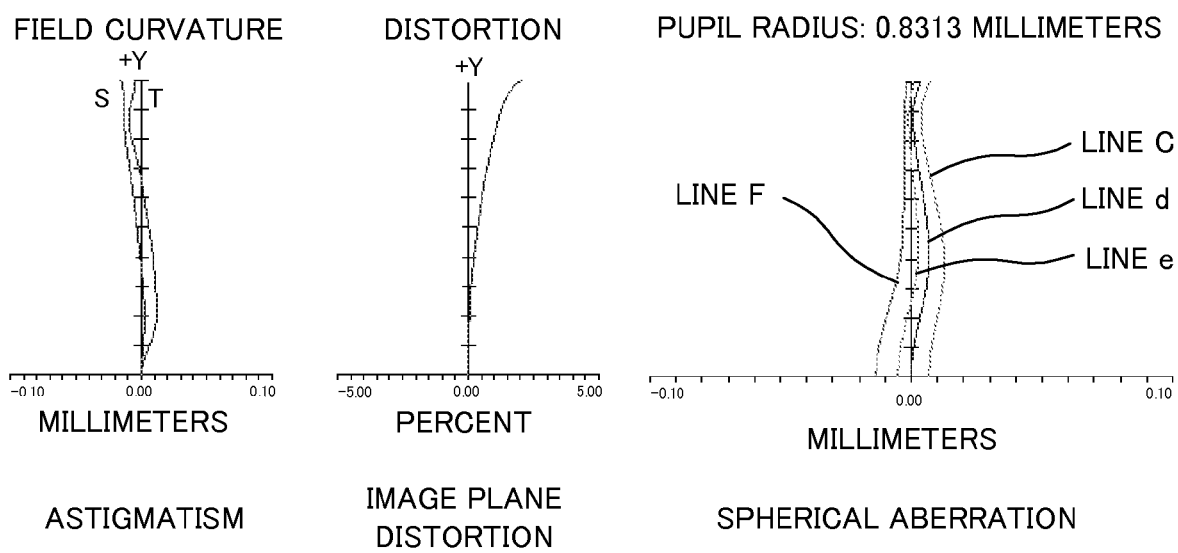
FIG. 9 is aberration graphs illustrating the astigmatism, the image plane distortion, and the spherical aberration of the imaging lens of the embodiment 4.
Figure 10:
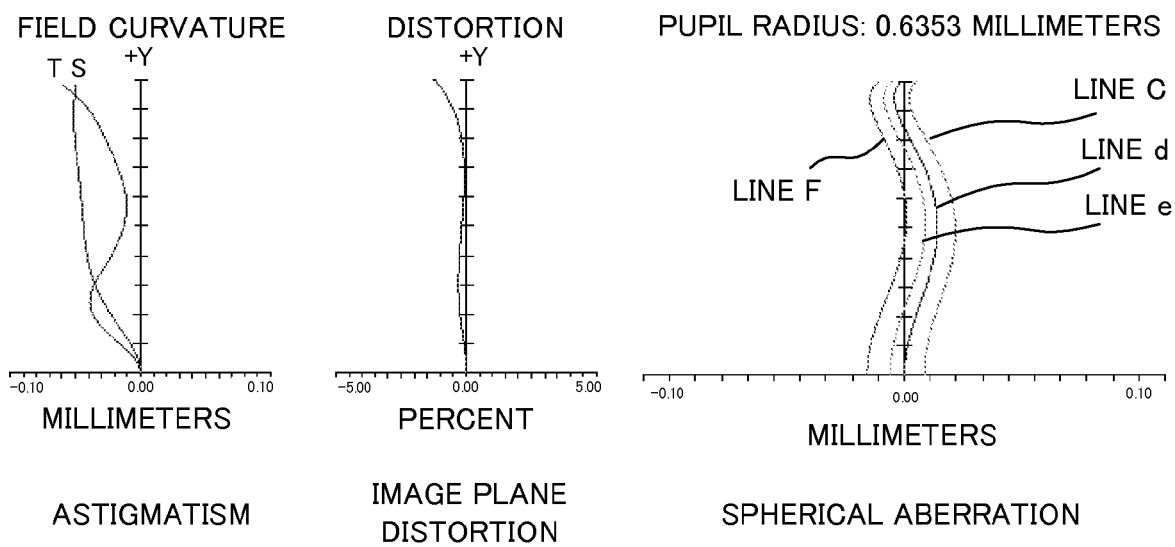
FIG. 10 is aberration graphs illustrating the astigmatism, the image plane distortion, and the spherical aberration of the imaging lens of the embodiment 5.

As illustrated in FIG. 5, an imaging lens according to the embodiment 5 of the present invention has the following lens configuration:

Table 5(a) is a table showing data on the configuration of the imaging lens according to the embodiment 5.

Table 5(b) is a table showing the aspherical coefficient of the imaging lens according to the embodiment 5.

TABLE 5(a)

Data on configuration of the imaging lens

| No. | r | d | nd | νd | |
|---|---|---|---|---|---|
| s1 | 0.000 | 0.044 | | | Aperture |
| 2 | 3.249 | 0.819 | 1.53116 | 56 | First lens |
| 3 | −2.735 | 0.151 | | | |
| 4 | −6.667 | 0.479 | 1.58547 | 30 | Second lens |
| 5 | 3.408 | 0.703 | | | |
| 6 | −3.176 | 0.727 | 1.53116 | 56 | Third lens |
| 7 | −1.400 | 0.192 | | | |
| 8 | 2.102 | 0.657 | 1.53116 | 30 | Fourth lens |
| 9 | 1.131 | 1.005 | | | |
| 10 | 0.000 | 0.210 | 1.5168 | 64 | Parallel plane glass plate |
| 11 | 0.000 | 0.827 | | | |
| 12 | 0.000 | 0.000 | | | |

TABLE 5(b)

Conical coefficient and aspherical coefficient

| | k | α4 | α6 | α8 | α10 | α12 |
|---|---|---|---|---|---|---|
| 2 | −6.931905784 | −0.022728129 | 0.00754404 | −0.120882615 | 0.190255382 | −0.170569182 |
| 3 | 1.685468226 | −0.062591768 | 0.025905657 | 0.007932732 | −0.032116234 | 0.001586222 |
| 4 | −109.5858235 | −0.125032296 | 0.117629109 | −0.019028182 | −0.010952473 | 0.00199426 |
| 5 | −0.8464768 | −0.011942677 | −0.006390796 | 0.024094875 | −0.008536555 | −0.000194419 |
| 6 | 3.137785171 | 0.135900298 | −0.056422518 | 0.009269688 | 0.001783958 | −0.00027557 |
| 7 | −1.620331273 | 0.104272272 | −0.037903127 | 0.004095903 | 0.000266103 | 6.53813E−05 |
| 8 | −2.053674981 | −0.050474781 | 0.006059712 | −0.000401431 | 1.32845E−05 | 6.5162E−07 |
| 9 | −4.089670435 | −0.02517803 | 0.002405567 | −0.000181207 | −3.49023E−06 | 1.7108E−07 |

The focal length f of the entire lens of the imaging lens according to this embodiment is 4.447 mm, the F value is F3.5, and the angle of view $2\omega$ is 66.2°.

Assuming that each of the lenses L1, L2, L3, and L4 comprises two lens surfaces, that the aperture S comprises one surface, and that the parallel plane glass plate G comprises two surfaces, Table 5(a) presents of the curvature radius of each lens surface "r", the distance "d", the refraction index with respect to line d "nd", and the Abbe number "νd". The "No." column in Table 5(a) lists lens surface numbers, which are assigned in ascending sequence, starting from the lens surface nearest to the object. The lens surface number "s1" denotes the aperture S. The distance "d" denotes the distance from one lens surface to the next one.

Table 5(b) presents the conical coefficient "k" and the aspherical coefficients "$\alpha_4$", "$\alpha_6$", "$\alpha_8$", "$\alpha_{10}$", and "$\alpha_{12}$" of the lens surfaces of the embodiment 5. The "No." column in Table 5(b) lists lens surface numbers corresponding to those in the "No." column of Table 5(a).

Table 6 shows numerical values obtained from above-mentioned equations (1) to (5) in the embodiments 1 to 5 described above.

TABLE 6

Numerical values obtained from equations

| | Embodiment 1 | Embodiment 2 | Embodiment 3 | Embodiment 4 | Embodiment 5 |
|---|---|---|---|---|---|
| Equation (1) | 1.687 | 1.646 | 1.609 | 1.660 | 1.572 |
| Equation (2) | 1.600 | 1.508 | 1.226 | 0.945 | 1.116 |

TABLE 6-continued

| | Numerical values obtained from equations | | | | |
| --- | --- | --- | --- | --- | --- |
| | Embodiment 1 | Embodiment 2 | Embodiment 3 | Embodiment 4 | Embodiment 5 |
| Equation (3) | −0.0035 | −0.0031 | −0.0030 | −0.0014 | −0.0027 |
| Equation (4) | 0.0007 | 0.0009 | 0.0014 | 0.0002 | 0.0014 |
| Equation (5) | 0.145 | 0.144 | 0.152 | 0.131 | 0.121 |

The imaging lens according to the embodiments 1 to 5 provide images with a corrected chromatic aberration since the chromatic aberration occurred in the lens L1 having positive refractive power is corrected by the double-concave-shaped lens L2 having negative refractive power, and the chromatic aberration occurred in the lens L3 having positive refractive power is corrected by the lens L4 having negative refractive power.

The imaging lens according to the embodiments 1 to 5 also fulfill equation (1) to (5).

Equation (1) is directed to specifying the power balance of the first lens L1. At values above the upper limit value, the spherical and chromatic aberrations are significant, thereby deteriorating the performance of the imaging lens. To the contrary, at values below the lower limit value, the overall length of the imaging lens is too long because the power of the first lens L1 decreases.

Equation (2) is directed to specifying the power balance of the third lens L3. At values above the upper limit value, the power of the third lens L3 increases and, therefore, the back focus thereof is unnecessarily shortened. Further, at values below the lower limit value, the power of the third lens L3 decreases. Therefore, it is difficult to correct aberrations (coma aberration, astigmatism, and distortion) for a periphery of the image plane (frame).

Equation (3) is directed to effectively compensating the chromatic aberration occurred in the first lens L1 by the second lens L2. At values above and below the range specified by this equation, compensation for the chromatic aberration is difficult.

Equation (4) is directed to effectively compensating the chromatic aberration occurred in the third lens L3 by the fourth lens L4. At values above and below the range specified by this equation, compensation for the chromatic aberration is difficult.

Equation (5) is directed to specifying the ratio of the spacing between the second lens L2 and the third lens L3 to the overall length of the imaging lens. By setting the spacing between the second lens L2 and the third lens L3 to be equal to or greater than the lower limit value of equation (5), various aberrations (coma aberration, astigmatism, and distortion) can be effectively corrected for a periphery of the image plane (frame) which is apart from the light axis, taking advantage of the difference in passing height between the light rays passing along the light axis and those passing through a periphery of the lens. Incidentally, the upper limit value of equation (5) is directed to preventing the overall length of the lens from increasing to an unnecessary extent.

FIGS. 6 to 10 show examples of actual measurements of the astigmatism, the image plane distortion, and the spherical aberration of the respective embodiments. As is apparent from these aberration graphs, the respective aberrations are favorably corrected. Accordingly, the imaging lens according to the embodiments 1 to 5 of the present invention is small-sized and has an overall length that is not excessively long.

Also, the focal length, the F value, and the angle of view $2\omega$ of the lens are at desirable levels, and the lens can provide images in which aberrations (coma aberration, astigmatism, distortion, and spherical aberration) at a peripheral of an image plane apart from the light axis and the chromatic aberration are well corrected.

Furthermore, in the imaging lens according to the embodiments 1 to 5, the aperture S may be disposed between the first lens L1 and the object, thereby facilitating miniaturization.

The imaging lens having the above-described features may be utilized in any given situation.

Figure 11:
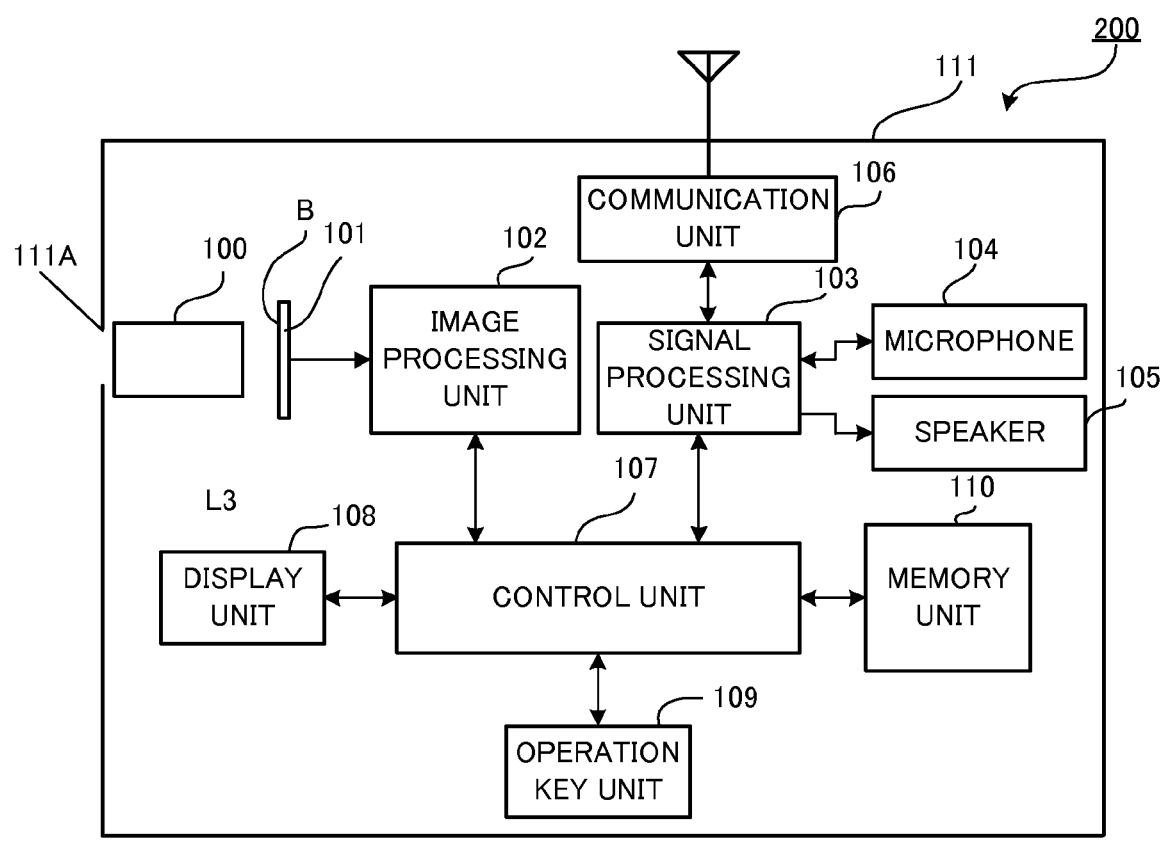
FIG. 11 is a schematic block diagram showing an example of an imaging apparatus and a mobile terminal apparatus which include an imaging lens according to the embodiments.

Referring to FIG. 11, an explanation will be made as to an example in which an imaging lens 100 is used, as an imaging lens in a camera of a mobile terminal apparatus.

As shown, a mobile terminal apparatus 200 comprises the imaging lens 100 as described above, an imaging device 101, an image processing unit 102, a signal processing unit 103, a microphone 104, a speaker 105, a communication unit 106, a control unit 107, a display unit 108, an operation key unit 109, a memory unit 110, and a casing 111.

The imaging device 101 comprises a solid-state image sensing device, such as a CCD (Charge Coupled Device) or CMOS (Complementary Metal Oxide Semiconductor) sensor, and an image plane is provided on the forming plane B of the imaging lens 100.

The image processing unit 102 processes image signals supplied from the imaging device 101, modifies the image signals into image signals per unit frame, and supplies them to the control unit 107.

The microphone 104 collects the voice of a caller, converts the voice into an electric signal, and supplies it to the signal processing unit 103.

The speaker 105 converts the audio signal supplied from the signal processing unit 103 into the voice for sounding.

During a phone call, the signal processing unit 103 generates a base band signal from the audio signal supplied from the microphone 104, supplies the base band signal to the communication unit 106, reproduces the audio signal from the base band signal supplied from the communication unit 106, and supplies the audio signal to the speaker 105.

Furthermore, during data communication, the signal processing unit 103 generates a base band signal from a data signal supplied from the control unit 107, supplies the base band signal to the communication unit 106, reproduces the data signal from the base band signal supplied from the communication unit 106, and supplies the data signal to the control unit 107.

The communication unit 106 generates a transmission signal from the base band signal supplied from the signal processing unit 103, and transmits it through an antenna. The communication unit 106 also receives a wireless signal at a desired frequency through the antenna, demodulates the base band signal, and supplies it to the signal processing unit 103.

The control unit 107 comprises a one-chip processor or the like and performs overall control of the mobile terminal apparatus 200.

The display unit 108 comprises a liquid crystal display unit or the like and displays videos, e.g., images provided from the control unit 107.

The operation key unit 109 comprises a keyboard or the like and inputs arbitrary instructions to the control unit 107.

The memory unit 110 stores operation programs for the control unit 107, images acquired by the image processing unit 102, data obtained from external devices through the communication unit 106, or the like.

The casing 111 contains the above-mentioned units 100 to 110. The aperture 111A is provided on the casing 111 for exposing the lens 100 to outside.

In such an arrangement, the lens 100 forms an image of the object on the image plane of the imaging device 101. When the camera function is turned on, the imaging device 101 converts the image of the object into an electric signal (a video signal), and supply it to the image processing unit 102. The image processing unit 102 processes the video signal supplied thereto, converts it into a video signal in a predetermined format, and supplies it to the control unit 107.

The control unit 107 supplies the video signal supplied thereto to the display unit 108, which displays the video signal as a so-called "through image". Further, the control unit 107 stores the video signal in the memory unit 110 in response to the operation of a shutter button provided on the operation key unit 109.

The control unit 107 controls incoming and outgoing calls in response to an instruction from the key operation unit 109. In the phone call mode, the signal processing unit 103 processes voice from the microphone 104, and transmits it through the communication unit 106. Further, the signal processing unit 103 demodulates the audio signal received through the communication unit 106 for sounding from the speaker 105. Furthermore, in the data communication mode, the control unit 107 conducts data communication with external devices through the signal processing unit 103 and the communication unit 106.

As the mobile terminal apparatus 200 so configured uses the imaging lens 100, aberrations of images can be well corrected with the size of the apparatus being small.

Moreover, the present invention is applicable to any other given situation.

The present invention is based on the parent application of the present application, Japanese Patent Application No. 2006-346287, with a conventional priority date of Dec. 22, 2006, and all descriptions therein are incorporated herein by reference.

The invention claimed is:

1. An imaging lens comprising:
a first lens, a second lens, a third lens, and a fourth lens, which are arranged in ascending sequence, starting from a lens nearest to an object, wherein:
the first lens has a double-convex shape and positive refractive power;
the second lens has a double-concave shape and negative refractive power;
the third lens has a meniscus shape with its convex surface facing an image, and has positive refractive power;
the fourth lens has a meniscus shape with its convex surface facing the object; and
following equations (1) to (5) are fulfilled:

$$1.55 < f/f1 < 1.7 \quad (1),$$

$$0.9 < f/f3 < 1.65 \quad (2),$$

$$-0.004 < 1/f1v1 + 1/f2v2 < 0 \quad (3),$$

$$|1/f3v3 + 1/f4v4| < 0.015 \quad (4), \text{ and}$$

$$0.12 < T23/TTL < 0.16 \quad (5),$$

where
f: combined focal length of the entire imaging lens,
f1: focal length of the first lens,
f2: focal length of the second lens,
f3: focal length of the third lens,
f4: focal length of the fourth lens,
v1: Abbe number of line d of the first lens,
v2: Abbe number of line d of the second lens,
v3: Abbe number of line d of the third lens,
v4: Abbe number of line d of the fourth lens,
T23: spacing between the second lens and the third lens, and
TTL: distance from an apex of the first lens to an image plane.

2. The imaging lens according to claim 1, wherein an aperture is disposed between the first lens and the object.

3. The imaging lens according to claim 1, wherein a combined focal length f from the first to fourth lenses fulfills following condition:

$$4.445 \text{ mm} \leq f \leq 4.655 \text{ mm}.$$

4. The imaging lens according to claim 1, wherein a combined F value of the first to fourth lenses fulfills following condition:

$$2.8 \leq F \leq 3.5.$$

5. The imaging lens according to claim 1, wherein a combined angle of view of the first to fourth lenses fulfills following condition:

$$62.5° \leq 2\omega \leq 67.3°.$$

6. The imaging lens according to claim 1, wherein a parallel plane glass plate is disposed between the fourth lens and an image forming plane.

7. An imaging apparatus comprising:
the imaging lens according to claim 1; and
an imaging device that converts an object image produced by the imaging lens into an electrical signal.

8. A mobile terminal apparatus comprising the imaging apparatus according to claim 7.

* * * * *